US009811407B2

(12) United States Patent
Wang

(10) Patent No.: US 9,811,407 B2
(45) Date of Patent: Nov. 7, 2017

(54) SYSTEM IS APPLIED TO CONTROL INDICATOR LIGHTS FOR NON-VOLATILE MEMORY EXPRESS SOLID STATE DISK

(71) Applicants: Inventec (Pudong) Technology Corporation, Shanghai (CN); INVENTEC CORPORATION, Taipei (TW)

(72) Inventor: Cheng Wang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/009,629

(22) Filed: Jan. 28, 2016

(65) Prior Publication Data
US 2017/0161137 A1    Jun. 8, 2017

(30) Foreign Application Priority Data
Dec. 2, 2015 (CN) .......................... 2015 1 0875197

(51) Int. Cl.
*G06F 11/32*    (2006.01)
*G06F 11/07*    (2006.01)
(Continued)

(52) U.S. Cl.
CPC ........ *G06F 11/0772* (2013.01); *G06F 11/079* (2013.01); *G06F 11/0727* (2013.01);
(Continued)

(58) Field of Classification Search
CPC .... G06F 11/326; G06F 11/325; G06F 3/0653; G06F 3/0688; G06F 3/0679; G06F 3/0673
See application file for complete search history.

(56) References Cited

U.S. PATENT DOCUMENTS 6,487,623 B1 *   11/2002   Emerson ............. G06F 13/4081
                                                              710/302
8,830,611 B1 *    9/2014   Chen ................... G06F 11/3034
                                                               360/31
(Continued)

FOREIGN PATENT DOCUMENTS

| CN | 104951384 A | 9/2015 |
| CN | 105096991 A | 11/2015 |
| TW | 201217989 A1 | 5/2012 |

OTHER PUBLICATIONS

A Fresh Look at Storage Performance with PCIe SSDs by Geoff Gasior published by techreport.com, Mar. 31, 2015 http://techreport.com/review/28032/a-fresh-look-at-storage-performance-with-pcie-ssds.*

(Continued)

*Primary Examiner* — Joseph Schell
(74) *Attorney, Agent, or Firm* — Muncy, Geissler, Olds & Lowe, P.C.

(57) ABSTRACT

A system is applied to control indicator lights for non-volatile memory express solid state disk (NVMe SSD). The system includes a NVMe SSD, a complex programmable logic device (CPLD), a controller and a slave processor. The NVMe SSD has a control module for transmitting a disk position signal. The CPLD is electrically connected to the control module so as to receive the disk position signal. The controller is electrically connected to the CPLD to light up a location indicator light. The slave processor is electrically connected to the control module and a fail indicator light. When the slave processor detect the NVMe SSD is operated under an abnormal condition, a fail signal is transmitted to light up a fail indicator light.

8 Claims, 1 Drawing Sheet

(51) Int. Cl.
*G06F 11/30* (2006.01)
*G06F 3/06* (2006.01)
(52) U.S. Cl.
CPC ...... *G06F 11/0751* (2013.01); *G06F 11/3034* (2013.01); *G06F 11/326* (2013.01); *G06F 3/0653* (2013.01); *G06F 11/325* (2013.01)

(56) References Cited

U.S. PATENT DOCUMENTS

| | | | |
|---|---|---|---|
| 2002/0032885 A1* | 3/2002 | Dai | G06F 11/326 |
| | | | 714/57 |
| 2008/0225474 A1* | 9/2008 | Flynn | G06F 1/183 |
| | | | 361/807 |
| 2008/0320214 A1 | 12/2008 | Ma et al. | |
| 2010/0214586 A1* | 8/2010 | Suzuki | G06F 9/441 |
| | | | 358/1.13 |
| 2016/0117461 A1* | 4/2016 | Yeh | G06F 19/3412 |
| | | | 705/2 |
| 2016/0320995 A1* | 11/2016 | Warriner | G06F 3/0625 |
| 2017/0027073 A1* | 1/2017 | Zani | G06F 1/185 |

OTHER PUBLICATIONS

How to Build a Computer (Basics, Compatibility and Construction) by Hailfire91 historical version from Mar. 16, 2013 found via the WayBack Machine http://web.archive.org/web/20130316150227/ http://www.instructables.com/id/How-to-build-a-computerbasics-compatibility-and-/step19/Install-the-back-plate/.*

* cited by examiner

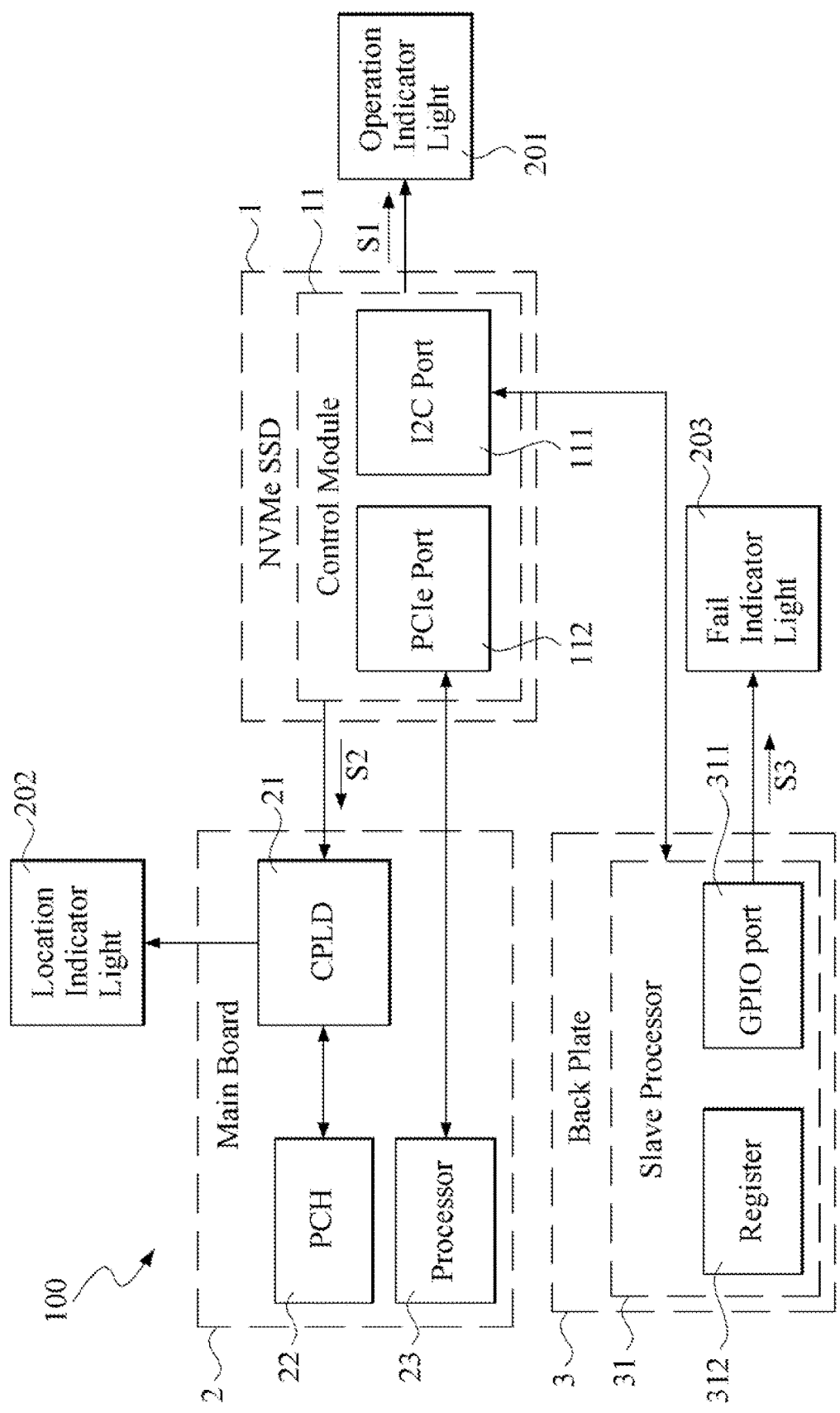

SYSTEM IS APPLIED TO CONTROL INDICATOR LIGHTS FOR NON-VOLATILE MEMORY EXPRESS SOLID STATE DISK

BACKGROUND OF INVENTION

1. Field of the Invention

The present invention is related to a system for controlling indicator lights of a solid state disk, and more particularly related to a system for controlling indicator lights of a non-volatile memory express solid state disk.

2. Description of the Prior Art

The traditional hard disk drive (HDD) is a data storage device which uses magnetic heads to read and write data stored on a rotating disk. Thus, read and write speed of hard disk drives is mainly decided by the rotational speed of the disk and the data transferring speed of the interface. The typical hard disk drives in present have a rotational speed of 7200 revolution per minute (rpm), and some may achieve the rotational speed of 15000 rpm for higher read and write speeds, but the read and write speed of the hard disk drive has the limit in nature. In order to further enhance the read and write speeds, the solid state drive (SSD) using the so called flash memory was developed. The SSD has a read speed about 3 times the read speed of the HDD and a write speed about 1.5 times the write speed of the HDD, but a smaller power consumption, and also has the advantages of no noise generated, great vibration and shock resistance, and lower heat produced.

In the beginning, the SDD was designed to transfer data through the Serial Advanced Technology Attachment (SATA) interface specified by the Advanced Host Controller Interface (AHCI) standard. Because this is an interface designed for the traditional HDD, the data transferring speed of SSD would be influenced by the latency event when the storage control IC is dealing with the read and write operation of the disk drive. Thus, even though the SATA specification was developed from 2.0 revision (3 Gb/s, 300 MB/s) to 3.0 revision (6 Gb/s, 600 MB/s), it still cannot meet the data transferring capability of SSD. As a result, the data transferring ability of SSD would be restricted by the bandwidth of the data transferring interface.

In order to resolve the problem due to the limitation of data transferring interface bandwidth, the SSD in present tends to be made using the peripheral component interconnect express (PCIe) standard, i.e. a new SSD standard called non-volatile memory express (NVMe), to effectively improve the data transferring ability of SSD. Take the specification of PCIe 3.0 x8 as an example, the data transferring speed of PCIe 3.0 x8 is about ten times higher than that of the traditional SATA 3.0.

Regarding the other data transferring performance, in compared with the AHCI standard, which generates a latency about 2.5 micro second due to the need of accessing register four times when executing a command, NVMe interface simplifies the operation and thus it is not necessary to access the register when executing a command so as to show off the advantage of low latency. In addition, because the NVMe interface has a maximum queue depth of 65536 command queues and 65536 commands per queue, the advantage of parallel operation of NAND flash memories can be effectively exhibited. In contrast, AHCI interface only has a maximum queue of one command queue and 32 commands per queue. Thus, input/output operations per second (IOPS) of NVMe interface is much higher than that of AHCI interface.

As mentioned, although NVMe SSD is provided with extremely high data transferring speed, the SSD in present lacks the control module as the controller of the traditional HDD which is capable to parse the disk status and light up the corresponding indicator light. Thus, it would be difficult for the user to recognize the operation status of the SSD.

SUMMARY OF THE INVENTION

The control module of the NVMe SSD in present lacks the capability to parse the disk status, such that the user cannot recognize the status of the NVMe SSD clearly. In addition, it is also difficult for the user to search the specific NVMe SSD or the power status when assembling the NVMe SSD. Accordingly, a system to control indicator lights for a NVMe SSD is provided in the present invention, which electrically connected to the component of the NVMe SSD to recognize whether the NVMe SSD is operated under an abnormal condition and light up the fail indicator light accordingly. In addition, the user is capable to identify the position of the specific NVMe SSD by lighting up the corresponding position indicator light.

In accordance with the object of the present invention, a system to control indicator lights for non-volatile memory express (NVMe) solid state disk (SSD) is provided. The system comprises a NVMe SSD, a complex programmable logic device (CPLD), a controller, and a slave processor. The NVMe SSD has a control module for transmitting a disk position signal. The CPLD is electrically connected to the control module for receiving the disk position signal to light up a location indicator light. The controller is electrically connected to the CPLD to light up the location indicator light. The slave processor is electrically connected to the control module through an inter integrated circuit (I2C) bus. The slave processor includes a general purpose I/O (GPIO) port electrically connected to a fail indicator light. When the slave processor detects the NVMe SSD is operated under an abnormal condition, a fail signal is transmitted to the fail indicator light to light up the fail indicator light.

In accordance with an embodiment of the present invention, the controller is a platform controller hub (PCH). As a preferred embodiment, the system to control indicator lights for NVMe SSD further comprises a main board, and the PCH is located on the main board.

In accordance with an embodiment of the present invention, the control module is electrically connected to a operation indicator light, and the operation indicator light is lighted up when the NVMe SSD is operated normally.

In accordance with an embodiment of the present invention, the system to control indicator lights for NVMe SSD further comprises a processor, and the control module includes a peripheral component interconnect express (PCIe) port electrically connected to the processor. As a preferred embodiment of the present invention, the system to control indicator lights for NVMe SSD further comprises a main board. The processor is located on the main board, and the CPLD is located on the main board.

In accordance with an embodiment of the present invention, the control module further comprises an inter integrated circuit port, and the slave processor is electrically connected to the inter integrated circuit port through the I2C bus.

In accordance with an embodiment of the present invention, the slave processor includes a register for storing at least a read/write data from the NVMe SSD to recognize whether the NVMe SSD is operated under the abnormal condition.

In accordance with an embodiment of the present invention, the system to control indicator lights for NVMe SSD further comprises a back plate, and the slave processor is located on the back plate.

As mentioned, the internal controller of the conventional NVMe SSD lacks the capability to parse the operation status of the SSD for providing the indicator light to notify the user. In contrast, the system provided in the present invention features the corporation of the CPLD and the controller for the user to light up the adequate indicator lights and also the slave processor connected to the NVMe SSD for recognizing whether the NVMe SSD fails and further lighting up the fail indicator light to notify the user. Thereby, the system provided in the present invention can show the status of the NVMe SSD by using the indicator light to facilitate the operations such as to repair and change the NVMe SSD.

BRIEF DESCRIPTION OF THE DRAWINGS

The present invention will now be specified with reference to its preferred embodiment illustrated in the drawings, in which:

The FIGURE is a system schematic diagram of the system to control indicator lights of a non-volatile memory express solid state disk in accordance with an embodiment of the present invention.

DESCRIPTION OF THE PREFERRED EMBODIMENT

The FIGURE is a system schematic diagram of the system to control indicator lights of a non-volatile memory express (NVMe) solid state disk (SSD) in accordance with an embodiment of the present invention. As shown, the system 100 to control indicator lights of a NVMe SSD comprises a NVMe SSD 1, a main board 2, and a back plate 3.

The NVMe SSD 1 includes a control module 11. The control module 11 is electrically connected to an operation indicator light 201, and transmits an operation signal S1 to the operation indicator light 201 to light up the operation indicator light 201 when the NVMe SSD is operated normally. In addition, the control module 11 also includes an inter integrated circuit (I2C) port 111 and a peripheral component interconnect express (PCIe) port 112, and the control module 11 is utilized for transmitting a disk position signal S2.

The main board 2 has a complex programmable logic device (CPLD) 21, a platform controller hub (PCH) 22, and a processor 23 located thereon. The CPLD 21 is electrically connected to the control module 11 and a position indicator light 202 for receiving the disk position signal S2 transmitted from the control module 11. The PCH 22 is electrically connected to the CPLD 21 such that the user may control the CPLD 21 through the PCH 22 to light up the location indicator light 202 according to the disk position signal S2. In practice, the PCH 22 is electrically connected to the CPLD 21 by using the serial general purpose I/O (SGPIO) of the south bridge chip.

The processor 23 is electrically connected to the PCIe port 112 by using the PCIe bus.

The back plate 3 has a slave processor 31 formed thereon. The slave processor 31 is electrically connected to the I2C port 111 and also includes a general purpose I/O (GPIO) port 311 and a register 312. The GPIO port 311 is electrically connected to a fail indicator light 203. The register 312 is utilized for storing at least a read/write data from the NVMe SSD 1 to recognize whether the NVMe SSD 1 is operated under an abnormal condition. When a comparison is made by the register 312 to verify that the NVMe SSD 1 is operated under an abnormal condition, a fail signal S3 is transmitted from the GPIO port 311 to the fail indicator light 203 to light up the fail indicator light 203. In practice, the slave processor 31 is an advanced RISC Machine (ARM) processor.

In conclusion, in compared with the internal controller of the conventional NVMe SSD, which lacks the capability to parse the operation status of the SSD for providing the indicator light to notify the user, the system provided in the present invention features the corporation of the CPLD and the controller for the user to light up the adequate indicator lights and also the slave processor connected to the NVMe SSD for recognizing whether the NVMe SSD fails and further lighting up the fail indicator light to notify the user. Thereby, the system provided in the present invention can show the status of the NVMe SSD by using the indicator light to facilitate the operations such as to repair and change the NVMe SSD.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A system to control indicator lights for non-volatile memory express (NVMe) solid state disk (SSD), comprising:
   a NVMe SSD, having a control module for transmitting a disk position signal;
   a complex programmable logic device (CPLD), electrically connected to the control module for receiving the disk position signal to light up a location indicator light;
   a controller, electrically connected to the CPLD to light up the location indicator light; and
   a slave processor, electrically connected to the control module through an inter integrated circuit (I2C) bus, and including a general purpose I/O (GPIO) port electrically connected to a fail indicator light, wherein when the slave processor detects the NVMe SSD is operated under an abnormal condition, a fail signal is transmitted to the fail indicator light to light up the fail indicator light;
   wherein the controller is a platform controller hub (PCH).

2. The system to control indicator lights for NVMe SSD of claim 1, further comprising a main board, and the PCH is located on the main board.

3. The system to control indicator lights for NVMe SSD of claim 1, wherein the control module is electrically connected to a operation indicator light, and the operation indicator light is lighted up when the NVMe SSD is operated normally.

4. The system to control indicator lights for NVMe SSD of claim 1, further comprising a processor, and the control module including a peripheral component interconnect express (PCIe) port electrically connected to the processor.

5. The system to control indicator lights for NVMe SSD of claim 4, further comprising a main board, and the processor being located on the main board.

6. The system to control indicator lights for NVMe SSD of claim 5, wherein the CPLD is located on the main board.

7. The system to control indicator lights for NVMe SSD of claim 1, wherein the control module further comprises an inter integrated circuit port, and the slave processor is electrically connected to the inter integrated circuit port through the I2C bus.

8. The system to control indicator lights for NVMe SSD of claim 1, wherein the slave processor includes a register, for storing at least a read/write data from the NVMe SSD to recognize whether the NVMe SSD is operated under the abnormal condition.

* * * * *